April 12, 1949.　　　R. W. GROOM　　　2,466,946
BLOWDOWN VALVE
Filed Aug. 7, 1944
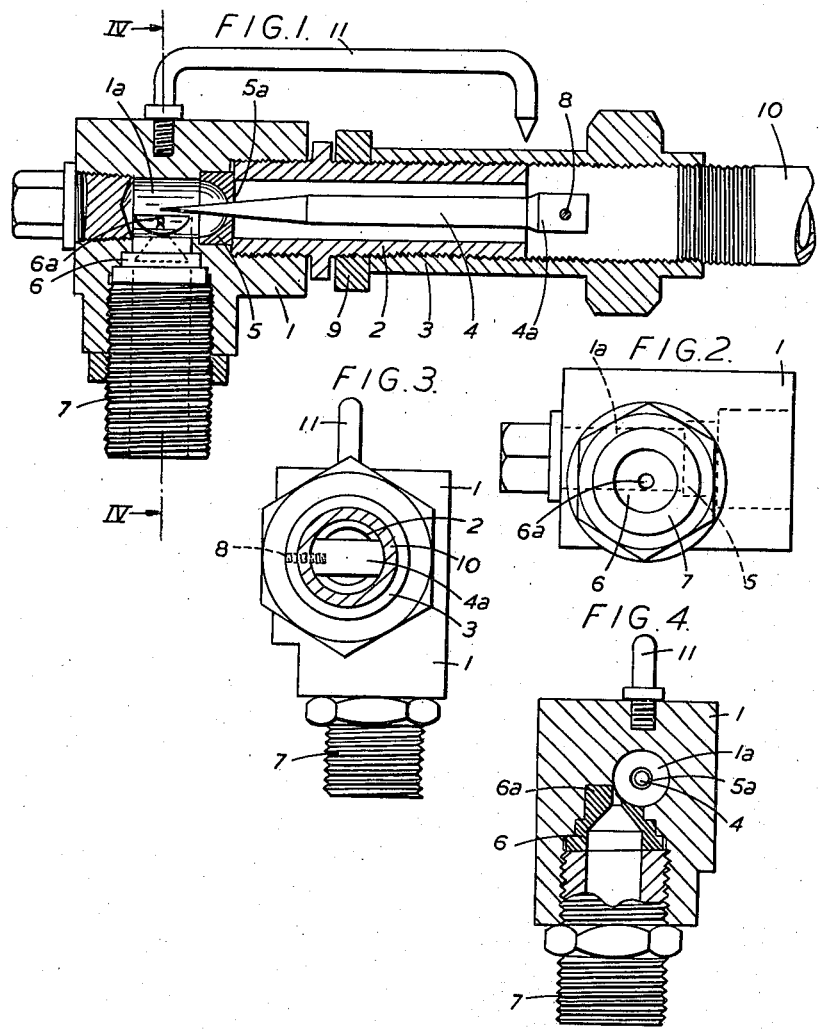
Inventor.
REGINALD WILLIAM GROOM.
By RWAdday
Attorney.

Patented Apr. 12, 1949

2,466,946

UNITED STATES PATENT OFFICE 2,466,946

BLOWDOWN VALVE

Reginald William Groom, Bromley, England

Application August 7, 1944, Serial No. 548,477
In Great Britain December 10, 1942

Section 1, Public Law 690, August 8, 1946
Patent expires December 10, 1962

4 Claims. (Cl. 251—29)

This invention relates to blow-down valves for steam generators, and more particularly to such valves for use in continuous blow-down systems, the valve being inserted in a flow stream consisting of particles of solids in suspension in a liquid.

Hitherto the drawback in blow-down valves has been their tendency to becoming choked up with the solids in suspension which it is the object of the blow-down process to remove from the boiler. Globe valves, owing to their pockets, quickly accumulate concentrate and are therefore not used, although they have the advantage of giving a watertight shut off when it is desired to close the valve entirely. Slide valves have been proposed and are used, but these cannot be depended on after some use to give an absolutely tight joint when the valve is closed. Needle valves with the needle arranged on the boiler side of the valve seating have been proposed, and while these have been satisfactory to a degree, they have not eliminated the chokage defect. It is the object of the present invention to provide a blow-down valve in which such chokage is entirely obviated so that the valve may be safely used for intermittent or continuous blowing down.

In experiments with known types of valves which have been carried out with a view to solving this problem of chokage, we have found that if the centre of the stream of water and solid concentrate is allowed a straight headon or axial flow through the constriction formed by the valve seating opening, there is a tendency to chokage and also variation in rate of flow. This may be due to the particles of the outer portions of the stream being forced by the valve seating to turn inwards at right angles to the direction of flow in order that they may pass through the constriction, and there meeting the axially moving particles in the centre portion of the stream and so causing a high concentration about the constriction with resultant chokage. This explanation seems to be confirmed by the fact that when means were provided to deflect the inner particles outwards, any inclination to chokage was obviated, and a consistent flow rate achieved.

Hence, according to the invention the blowdown valve comprises a hollow inlet member, a hollow discharge member, an apertured constriction between said inlet and discharge members, and means adapted to coact with the flow stream for imparting relative rotary motion between the flow stream and the constriction whereby the particles of solids in suspension are caused to move in the same direction as they approach the constriction, so that they are enabled to pass through the constriction without opposing one another and so causing chokage.

The means for imparting relative rotary motion comprises a swirl chamber of circular cross section arranged on the inner side of the constriction, which chamber tapers or domes down to the section of the constriction and is offset from the axis of the incoming stream of liquid and concentrate, so that as a result of the vortex thus created, the inner particles are thrown outwards.

The invention will now be described by way of example with reference to the accompanying drawings which show a preferred form of construction of variable orifice or constriction.

In the said drawings:

Fig. 1 is a longitudinal section of the blowdown valve device.

Fig. 2 is a side view of Fig. 1.

Fig. 3 is an end view of Fig. 1.

Fig. 4 is a section on the line IV—IV of Fig. 1.

Referring more particularly to the drawings, 1 is a block in which is formed a swirl chamber 1a which is coaxial with a discharge tube 2. In threaded engagement with the tube 2 is a control sleeve 3. 4 is a needle valve which has its shank integral with a haft 4a comprising the central segment of an externally threaded cylinder which is screwed into the correspondingly internally threaded control sleeve 3 to which it is pinned about midway along the said sleeve. The inner face of the haft is chamfered to facilitate the flow of the water and concentrate. The needle valve 4 is preferably of nickel steel or other erosion resisting metal, but for the sake of economy the tapered portion only may be of such and screwed into the end of the shank which with the haft may be of bronze.

The swirl chamber 1a is for a portion of its length of cylindrical form which then tapers down, or, as shown, domes down, to a central orifice 5a on the outside of which is formed the valve seating. The domed portion comprises a separate member 5 of nickel steel or other erosion resisting metal, and screws into a recess coaxial with the cylindrical portion of the chamber.

The inlet chamber comprises a separate domed or tapered portion 6 of nickel steel or other erosion resisting metal which is fitted into a stepped recess in the bolck 1. At its apex the chamber 6 communicates with the swirl chamber 1a through a converging passage 6a of minimum length on an axis at right angles to that of the swirl chamber and also offset therefrom (see Figs. 2 and 4) so that the direction of flow of the incoming water is tangential to the said swirl chamber. The outer end of the block 1 comprises a threaded cylindrical recess adapted to receive a chamber member 7 which holds the chamber member 6 in position and also constitutes a union for connecting the device to either a riser pipe from the boiler blow-down outlet or a riser pipe discharging from the boiler.

For a swirl chamber of ½" diameter, the control orifice in the dome portion may be ⅛" diameter, the diameter of the shank of the needle valve ³⁄₁₆", and the length of the taper of the valve ²³⁄₃₂", while the internal diameter of the discharge tube is ⅝".

The control sleeve 3 and needle valve 4 are relatively adjusted so that when the haft 4a is about midway along the control sleeve the needle valve projects from the former for an amount sufficient to give the necessary latitude for adjustment relatively to the orifice 5a, the needle valve being of a length to enable this to be done, and the two are locked by means of a grub screw 8 which passes through the sleeve 3 into the haft 4a.

To adjust the rate of discharge of the stream, the control sleeve 3—which is in threaded engagement with the discharge tube 2—is turned until the desired amount of annular orifice between the needle valve 4 and seating 5a is obtained. The control sleeve is then locked by screwing a lock nut 9—with or without a packing washer—against the said control sleeve.

The outer end of the control sleeve 3 is in threaded engagement with an outflow pipe 10 which is spaced from the haft of the needle valve for an amount sufficient to give the above latitude of adjustment. This construction gives a straight line axial discharge of the stream to atmosphere or other required point, as against the angular path of the stream caused by known types of blow-down valves.

11 is a pointer which reads against a scale, not shown, on the control sleeve 3 which can thus be set instantaneously to the optimum setting for a particular flow.

With the above form of blow-down valve there are no pockets to encourage chokage or inconsistent flow rate; but on the other hand the tapering or doming of the inlet and swirl chambers provide gentle funnelling into expansion areas which latter promote turbulence, while such turbulence is increased by the action of the swirl chamber causing the water and concentrate to pass down the expanding taper of the valve, through the orifice and into the larger expansion area of the discharge tube space in a vortex which renders it impossible for any of the concentrate to pack or settle down anywhere.

The device should be fitted at the top of a riser pipe from the boiler or other apparatus so that on discharging through the device the water has a gravitating flow to the purifying plant or to atmosphere, thus preventing any back settlement of solids in the discharge flow line when shut down.

When the device is used as a blow-down stop valve, a chamber should be arranged between the valve and the boiler and adjacent the former so that pieces of boiler scale and other relatively large pieces of solid matter coming down from the boiler may be trapped and prevented from passing into the valve device.

What I claim as my invention and desire to secure by Letters Patent of the United States is:

1. An improved blow-down valve for insertion in a flow stream consisting of particles of solid in suspension in a liquid, comprising a hollow inlet member, a hollow discharge member, an apertured constriction between said inlet and discharge members, a swirl chamber of circular cross section arranged on the entrance side of said constriction, said chamber being offset from the axis of the incoming stream of liquid and concentrate, and the wall of said chamber tapering to the section of the constriction so that as a result of the vortex thus created, there is a tendency to throw the particles and especially the inner lying particles outwards.

2. A blow-down valve according to claim 3 wherein the chamber in the block is in the form of a swirl chamber, an inlet chamber having a tapered portion which at its apex communicates with said swirl chamber on an axis at right angles to that of the swirl chamber, and also offset therefrom so that the direction of flow of the incoming water is tangential to the said swirl chamber.

3. A blow-down valve comprising a block having formed therein an axial chamber, a discharge tube projecting from said block so as to be coaxial with said axial chamber, said chamber tapering to a central constriction orifice, a valve seating on the outside of said constriction orifice, a control sleeve in threaded engagement with said discharge tube, and a needle valve rigidly secured to said control sleeve and projecting into said constriction orifice.

4. A blow-down valve according to claim 3 wherein the chamber in the block is in the form of a swirl chamber, an inlet chamber having a tapered portion which at its apex communicates with said swirl chamber on an axis at right angles to and offset from that of the swirl chamber, so that the direction of flow of the incoming water is tangential to the said swirl chamber and converging passage means of minimum length between said inlet chamber and said swirl chamber for communicating between said chambers.

REGINALD WILLIAM GROOM.

REFERENCES CITED

The following references are of record in the file of this patent:

UNITED STATES PATENTS

| Number | Name | Date |
|---|---|---|
| 840,583 | Pickels | Jan. 8, 1907 |
| 1,805,733 | Eckstine | May 19, 1931 |

FOREIGN PATENTS

| Number | Country | Date |
|---|---|---|
| 6,518 | Great Britain | 1903 |
| 16,256 | Great Britain | 1894 |
| 21,703 | Great Britain | 1912 |